(12) United States Patent
Sivasubramanian et al.

(10) Patent No.: US 12,143,343 B1
(45) Date of Patent: Nov. 12, 2024

(54) ARTIFICIAL AGENT GENERATOR

(71) Applicant: Amazon Technologies, Inc., Seattle, WA (US)

(72) Inventors: Swaminathan Sivasubramanian, Medina, WA (US); Vasanth Philomin, Seattle, WA (US); Ganesh Kumar Gella, Redmond, WA (US); Santosh Kumar Ameti, Bellevue, WA (US); Meghana Puvvadi, Seattle, WA (US); Manikya Pavan Kiran Pothukuchi, Sammamish, WA (US); Harshal Pimpalkhute, Redmond, WA (US); Rama Krishna Sandeep Pokkunuri, Redmond, WA (US); Yahor Pushkin, Redmond, WA (US); Roger Scott Jenke, Seattle, WA (US); Yaser Al-Onaizan, Cortlandt Manor, NY (US); Yi Zhang, Sammamish, WA (US); Saab Mansour, San Jose, CA (US); Salvatore Romeo, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/532,958

(22) Filed: Nov. 22, 2021

(51) Int. Cl.
*H04L 51/02* (2022.01)
*G06F 9/54* (2006.01)

(52) U.S. Cl.
CPC .............. *H04L 51/02* (2013.01); *G06F 9/541* (2013.01)

(58) Field of Classification Search
CPC ................................. H04L 51/02; G06F 9/541
See application file for complete search history.

(56) References Cited

U.S. PATENT DOCUMENTS

| | | | |
|---|---|---|---|
| 2022/0101839 A1* | 3/2022 | George | G06Q 30/016 |
| 2023/0076767 A1* | 3/2023 | Shepal | G06N 3/006 |
| 2023/0112369 A1* | 4/2023 | Chopra | G06F 40/279 705/304 |

* cited by examiner

*Primary Examiner* — Suraj M Joshi
(74) *Attorney, Agent, or Firm* — Davis Wright Tremaine LLP

(57) ABSTRACT

A system receives one or more transcripts of communications between entities. The system identifies a requested action in the communications based at least in part on a mapping between the requested action and an application programming interface. The system identifies one or more statements eliciting information, based on parameters to the application programming interface. The system generates a definition of an artificial agent based, at least in part, on the requested action and the one more statements eliciting information.

20 Claims, 8 Drawing Sheets

ARTIFICIAL AGENT GENERATOR

BACKGROUND

Artificial agents, sometimes referred to as chatbots, are increasingly used to facilitate communications between organizations and their clients. Artificial agents may be used, for example, to help clients with a variety of tasks such as scheduling and ordering. However, the task of creating artificial agents can be both complex and time-consuming.

BRIEF DESCRIPTION OF THE DRAWINGS

Various techniques will be described with reference to the drawings, in which.

DETAILED DESCRIPTION

Figure 1:
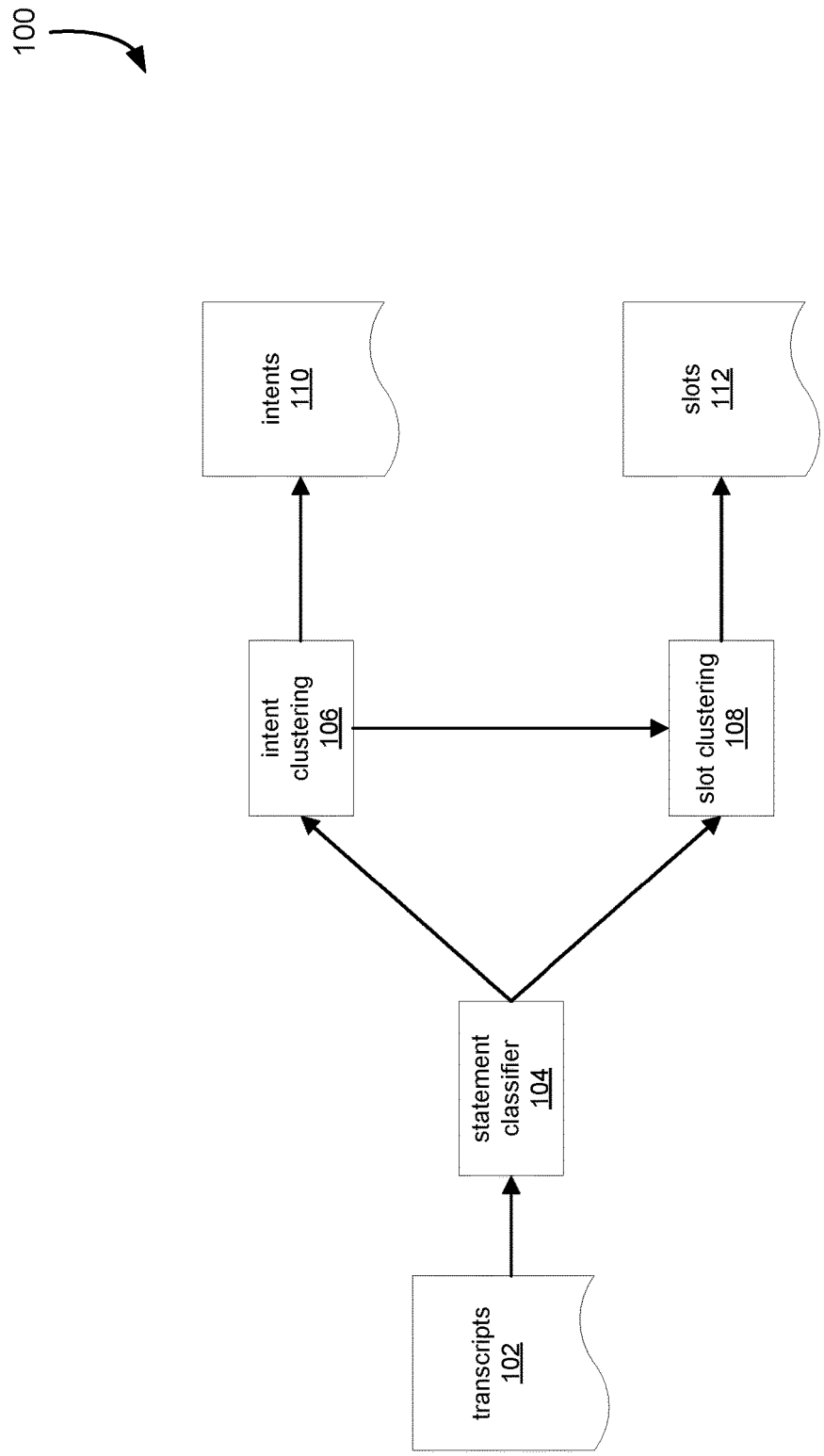
FIG. 1 illustrates an example of generating an artificial agent using intent and slot clustering, in accordance with at least one embodiment.

An artificial agent, sometimes referred to as a chatbot, includes computer programs, libraries, procedures, or functions that simulate an entity in a conversation. For example, an artificial agent may include code and/or circuitry that receives language input from an entity, and generates a response that is suitable, given the semantic meaning of the input. In at least one embodiment, the artificial agent is integrated with an application programming interface that allows the artificial agent to initiate an action on behalf of the entity. For example, the input from the entity might request that a product be ordered, and the response from the agent might be to invoke an application programming interface that orders the product. However, to do so, the artificial agent must obtain the information necessary to complete the order. This could include asking for relevant information, such as the name of the product, the address to which the product should be shipped, and so forth.

One challenge to creating artificial agents is that an agent must often handle a variety of scenarios and circumstances. For example, the agent may be asked to perform a wide variety of functions, in a variety of different ways. Further, when obtaining information from a participant in a chat, the agent may be perceived as awkward or stilted if it follows a heavily scripted approach. Accordingly, it can be difficult to create artificial agents that achieve a high level of user satisfaction.

In an example system, transcripts of communications between customers and agents are used to generate a definition of an artificial agent. Initially, these transcripts may represent human-to-human interactions. A generator component of the system classifies utterances within the transcripts as being informative of intent, eliciting information, or providing a response to an elicitation. Here, intent refers a goal that the customer is hoping to achieve via the communication, or an action that the customer is requesting. The system correlates utterances that elicit information with statements of intent, and uses this correlation to generate instructions for conducting a chat. The instructions can then be used to configure an artificial agent to recognize a customer's statement of intent, and response to the statement with questions suitable for accomplishing that intent.

In a further aspect of the example system, generation of the artificial agent is guided by the use of a specification of an application programming interface ("API") that mimics the actions that were available to the human agent in the transcripts. The functions that can be performed using the API serve to define a catalog of potential intents, and may further indicate what information should be elicited in order to accomplish an intent.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example of generating an artificial agent using intent and slot clustering, in accordance with at least one embodiment. The depicted system 100 analyzes transcripts 102 to generate output that comprises intents 110 and slots 112.

A transcript 102 comprises records of communications between entities. A communication refers to a conversation or interaction, and may be conceptualized as a series of utterances by the entities in the communications. The transcript comprises text-based representations of one or more conversations. It might be obtained by performing speech-to-text translation, or might represent one or more logs of text-based conversations, such as computer-based chats, cellphone text exchange, or email exchanges. In some embodiments, the transcript 102 may include personally identifiable information ("PII") that is to be excluded from any agent definition generated by the system 100. In other embodiments, the transcript 102 is pre-processed to redact PII. The depicted system 100 is, in such cases, able to analyze the transcript 102 and generate an agent definition using the previously redacted transcript.

The entities may comprise pairs of requestors and requestees, such that one entity is requesting that some action be performed on his or her behalf, and another that is responding to the request. For example, the entities might comprise a customer and an agent, where the customer is requesting something and the agent is attempting to respond to the request.

An utterance, or statement, refers to a unit of speech, such as a phrase or sentence. In embodiments, the utterances are presumed to be classifiable into categories, such as statements of intent, eliciting statements, and social statements.

A statement of intent refers to a statement that explicitly or implicitly makes a request. An example of an explicit statements of intent might include "I would like to schedule an appointment," while an example of an implicit statement might include "I haven't received my order." In the first case, the intent is to schedule an appointment, whereas in the latter the case, the intent might be inferred as "please check the status of my order."

A eliciting statement is one that is intended to collect information. It may in particular refer to statements made to collect information from the requesting entity, such as inquiring as to what product the requesting entity wishes to order, what their address is, and so forth.

A social statement may be one that is not directed to either of the two purposes noted above, or to statements made by one entity as a pleasantry towards the other.

In at least one embodiment, the system 100 analyzes the transcripts 102 using a statement classifier 104 that classifies utterances in the communications. For this stage, classification refers to a categorization of an utterance to facilitate further processing. The classifications, at this stage, may include but are not necessarily limited to those that classify the utterances as intent statements, eliciting statements, and social statements.

The statement classifier 104 comprises software and/or circuitry that implements a classification algorithm. The classification algorithm may be based on any of a variety of classification techniques, potentially including but not necessarily limited to those based on machine learning, logistic regression, stochastic gradient descent, nearest neighbor, and so forth.

In at least one embodiment, statements of intent are further analyzed by an intent clustering algorithm 106. Here, clustering refers to identification of groupings, or clusters, of the utterances around possible intents, where possible intents may be defined, at least in part, by actions that may be performed via an application programming interface.

In at least one embodiment, output of the intent clustering algorithm comprises intents 110, which comprises one or more eliciting statements to represent each of the identified clusters. In at least one embodiment, these statements correspond to actions that can be performed by an application programming interface.

The intent clustering algorithm 106 may be implemented as software and/or circuitry, and may be based on any of various clustering techniques. These may potentially include, but are not limited to, k-means clustering, density-based clustering, mean-shift clustering, expectation maximization clustering, Gaussian mixture models, centroid-based clustering, distribution-based clustering, and so forth. Clustering for eliciting statements, as described in more detail below, may be performed similarly.

In at least one embodiment, eliciting statements output from the statement classifier 104 are further analyzed by a slot clustering algorithm 108. The slot clustering algorithm 108 may, in at least one embodiment, comprise two stages. In the first stage, the slot clustering algorithm identifies groupings, or clusters, of eliciting utterances, where each group or cluster comprises statements that elicit similar pieces of information. In the second stage, the slot clustering algorithm associates these groups with statements of intent.

For example, consider the statement of intent "I would like to place an order." Eliciting statements such as "what do you wish to order" and "how many would you like" may be presumed, for the purpose of the example, to be necessary for placing an order. Analysis of the communications may infer this relationship based on various factors, potentially including but not limited to questions asked by one entity (e.g., an agent) in response to another entity (e.g., a customer) after the intent was expressed. This process may be guided, in some embodiments, by the parameters of an application programming interface that may be called to accomplish the intent. Continuing the example, the statement of intent might be associated with an application programming interface having the signature "place_order (int product_id, int quantity)," which informs the system 100 that statements eliciting this information may be important to the definition of an artificial agent.

The slots 112 may then be used to generate a definition of an artificial agent. In at least one embodiment, the definition of an artificial agent comprises configuration data or instructions that cause the agent, when communicating with a customer or other entity, to identify a statement of intent expressed by the customer and to generate statements that elicit, from the customer, the information needed to accomplish the intent. The artificial agent might therefore determine that a customer is requesting the placement of an order, and based on the slotting, generate and present to the customer the eliciting statements "what would you like to order" and "how many would you like."

Figure 2:
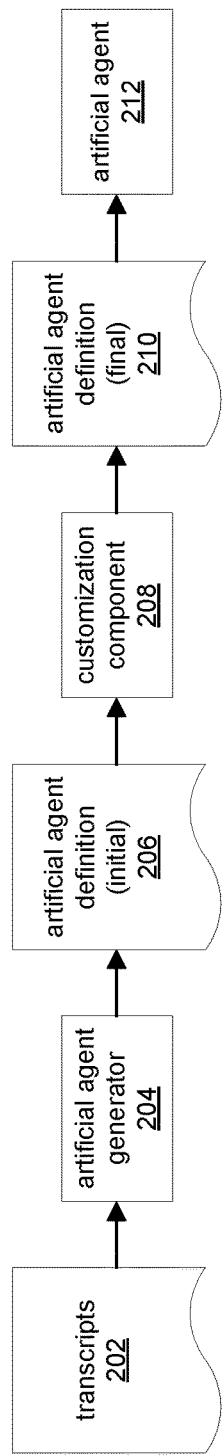
FIG. 2 illustrates an example system for generating an artificial agent based on transcripts of human-to-human communications, in accordance with at least one embodiment.

FIG. 2 illustrates an example system for generating an artificial agent based on transcripts of human-to-human communications, in accordance with at least one embodiment. The example system 200 implements a workflow for generating an artificial agent in which transcripts 202 of human-to-human interactions are analyzed and used to generate an artificial agent definition 206.

The artificial agent definition 206 comprises configuration data or instructions that cause the agent, when communicating with a customer or other entity, to identify a statement of intent expressed by the customer and to generate statements that elicit, from the customer, the information needed to accomplish the intent.

The artificial agent definition 206 may then be edited or refined, using a customization component 208, to produce a final artificial agent definition 210. The customization component 208 can comprise software and/or circuitry that presents the definition 210 to a user of the system 200 in a manner that facilitates editing or refinement. In at least one embodiment, the customization component 208 provides the definition 210 as an editable text file. In at least one embodiment, the customization component 208 provides a user interface for editing the definition 210.

The final version of the artificial agent definition 210 may then be used to configure an artificial agent 212. The artificial agent 212 can include software and/or circuitry that interprets and applies the definition 210 using natural language processing and natural language generation techniques. The artificial agent 212, in at least one embodiment, comprises software and/or circuitry for identifying statements of intent, and software and/or circuitry for generating and responding to eliciting statements that collect information necessary to accomplish the goal of an intent, using natural language processing and natural language generation algorithms implemented by the artificial agent's software and circuitry.

In at least one embodiment, the artificial agent 212 is configured, based on the artificial agent definition 210, to include machine learning or other algorithms adapted to recognize statements of intent, particularly including the statements of intent that were identified by the artificial agent generator 204. These algorithms can potentially include, but are not limited to, classification, clustering, and various natural language processing algorithms.

In at least one embodiment, the artificial agent is configured, based on the artificial agent definition 210, to include machine learning or other algorithms adapted to generate eliciting statements. By presenting these statements to an entity in a chat, the artificial agent invites the entity to provide the information the artificial agent needs to accomplish the entity's request. These algorithms can potentially include, but are not limited to, Markov chains, recurrent neural networks, long short-term memory networks, and so forth. The artificial agent definition 210 is used in the application of these algorithms, as appropriate for the particular algorithm. In at least one embodiment, templates or delexicalized versions of the eliciting statements are used by these algorithms.

Figure 3:
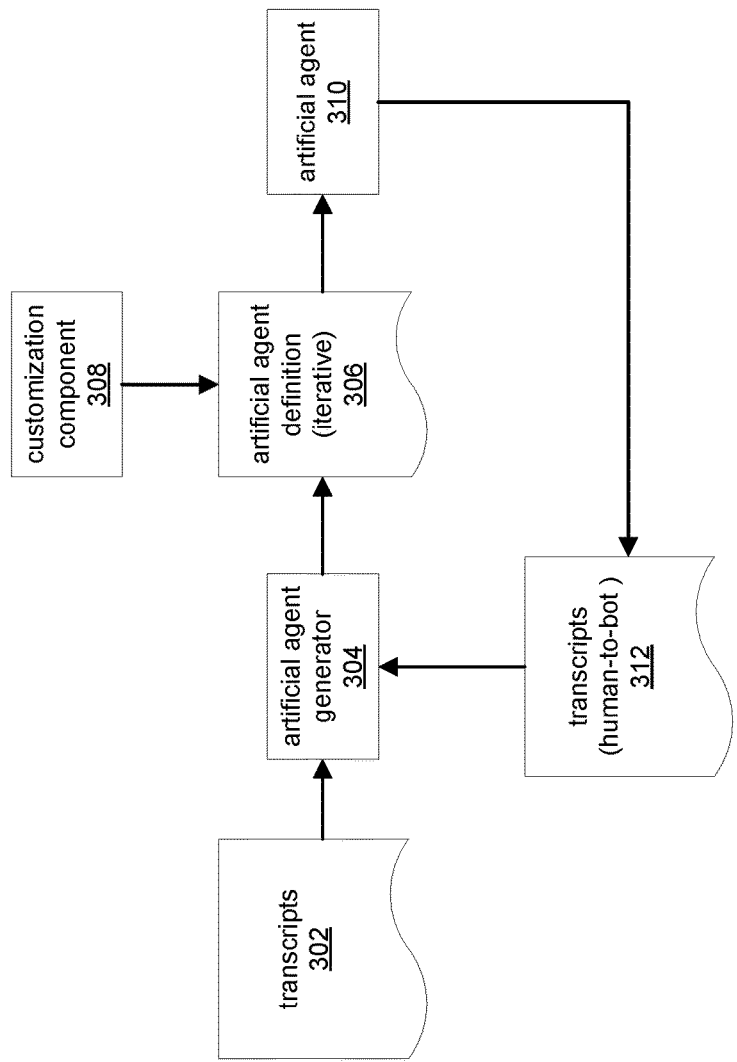
FIG. 3 illustrates an example system for iterative generation and refinement of an artificial agent, in accordance with at least one embodiment.

FIG. 3 illustrates an example system for iterative generation and refinement of an artificial agent, in accordance with at least one embodiment. The example system 300 comprises artificial agent generator 304, customization component 308, and artificial agent 310 that are similar to those depicted in FIG. 2.

The transcripts 302 are also similar to the transcripts depicted in FIG. 2, and comprise records of human-to-human interaction. These interactions may be described as being between two entities, such as between a customer and a human agent.

Using the transcripts 302, the artificial agent generator 304 generates an artificial agent definition 306 in a manner similar to what was described in relation to FIG. 2. This definition may be refined by the customer of the system 300 using the customization component 308, also in a manner similar to what was described in relation to FIG. 2, and used to configure the artificial agent 310.

The artificial agent 310 may then be deployed to test or production, and transcripts 312 of the resulting communications can be recorded. The transcripts 312 represent human-to-bot interactions, rather than human-to-human, since the artificial agent 310 constitutes one of the entities in the conversations. The transcripts can then be analyzed by the artificial agent generator 304, in a manner similar to what was described in relation to FIG. 2 regarding transcripts of human-to-human communications, and a more refined artificial agent definition 306 generated. The artificial agent definition 306 may be described as an iterative definition, since it can be continually improved based on the human-to-bot transcripts 312.

For example, the system might be trained to identify new statements of intent, or to better recognize a wider variety of ways in which an existing intent might be expressed. The system might also be trained to collect additional information, to trained to be better at eliciting information. For example, if a product is introduced into a new market, the customers might experience new service issues which require, for their resolution, different information than what was collected previously. In another example, the system learns new phrases that work better at eliciting information than phrases recognized by the system earlier.

Figure 4:
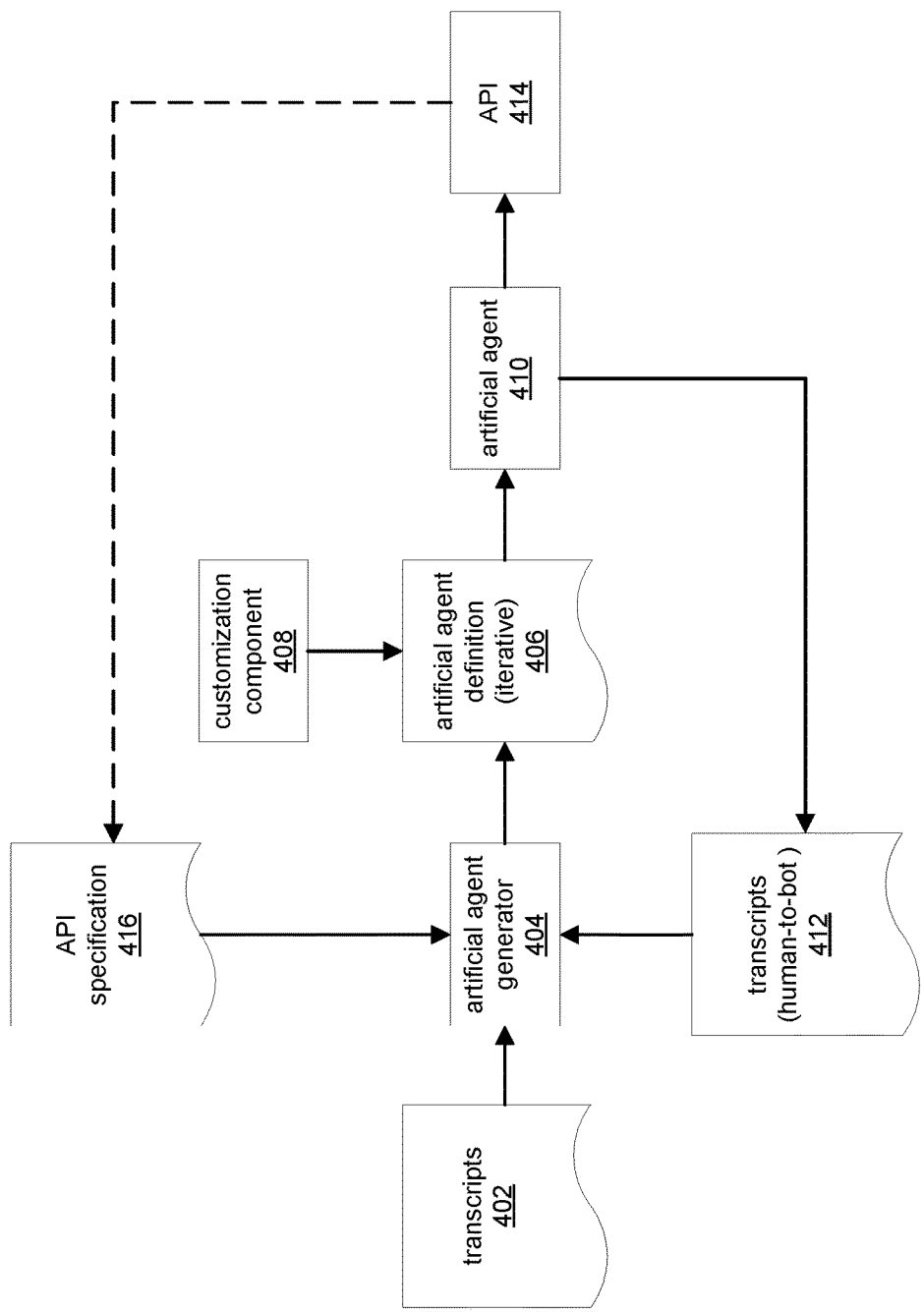
FIG. 4 illustrates an example system comprising integration of an artificial agent and an application programming interface, in accordance with at least one embodiment.

FIG. 4 illustrates an example system comprising integration of an artificial agent and an application programming interface, in accordance with at least one embodiment. The example system 400 comprises artificial agent generator 404, customization component 408, and artificial agent 410 that are similar to those depicted in FIGS. 2 and 3. Similarly to FIG. 3, the system 300 is capable of generating an iterative artificial agent definition 406 based on transcripts 402 of human-to-human communications and transcripts 412 of human-to-bot communications.

The artificial agent 410 is configured, using the artificial agent definition 406, to communicate with other entities. These entities make requests, which are recognized by the artificial agent 410 and classified as intents. The artificial agent 410 then elicits information from the entity, and uses this information to invoke a function of the API 414. The definition 406 of the artificial agent may include associations between the intent and a set of eliciting statements, which allows the artificial agent 410 to identify what information it should elicit.

In at least one embodiment, the artificial agent generator 404 incorporates data from an API specification 416 when analyzing human-to-human transcripts 402 or human-to-bot transcripts 412. As described in relation to FIG. 1, for example, a set of possible intents may be informed by the actions that can be performed by an API. To further illustrate, the API specification 416 might include a list of functions that can be performed using the API 414, and for each of the functions, a list of the information required to perform the function. By doing this, the artificial agent generator 404 is able to focus its language processing and recognition functions on a relatively small set of potential intents and eliciting statements, when compared to approaches that do not use such information.

The artificial agent definition 406, in at least one embodiment, includes mappings to action that the artificial agent can take in order to fulfill an intent. The original human-to-human transcripts 302 exclude technical details that could be used for the artificial agent to replicate actions manually taken by an agent in the transcript's communications. This gap may be addressed by incorporating the API specification 416. The corresponding API 414 may mimic the various systems used by a human agent as they interacts with a customer in the process of case resolution. The system may therefore incorporate the API specification 416 and perform automatic binding of identified intents to actions available in the API 414.

The artificial agent is defined, in at least one embodiment, through a mechanism of intent and slots related together in a dialog sequence. Interactions with artificial agents may be limited to scripted flows of conversation that are predefined. However, this limits the flexibility of conversations and interactions that are possible, and can lead to low satisfaction rates, abandoned attempts, and frequent transitions to a human agent. However, this can be mitigated by improving the way the agent is defined. Assuming that a particular bot has access to properly defined set of actions it can initiate on behalf of a customer, corresponding to the functions that can be performed with the API 414, the bot definition can be represented as a free-form dialog between an entity and the artificial agent. The agent's goal is to figure out the nature of the inquiry, obtain the information needed to respond to the inquiry, and perform the corresponding action, or set of actions, using the API 414. This approach enables the system to maintain natural-seeming conversation while still being oriented to translating the inquiry into the set of backend commands that the agent is authorized to execute.

Note, that the iterative features depicted in relation to FIG. 4 are optional, and that embodiments that do not include iteration may include features to integrate with an application programming interface, as just described. Accordingly, the API integration features discussed above may be utilized with any of the variety of embodiments described herein, including those depicted in FIGS. 1-3.

Figure 5:
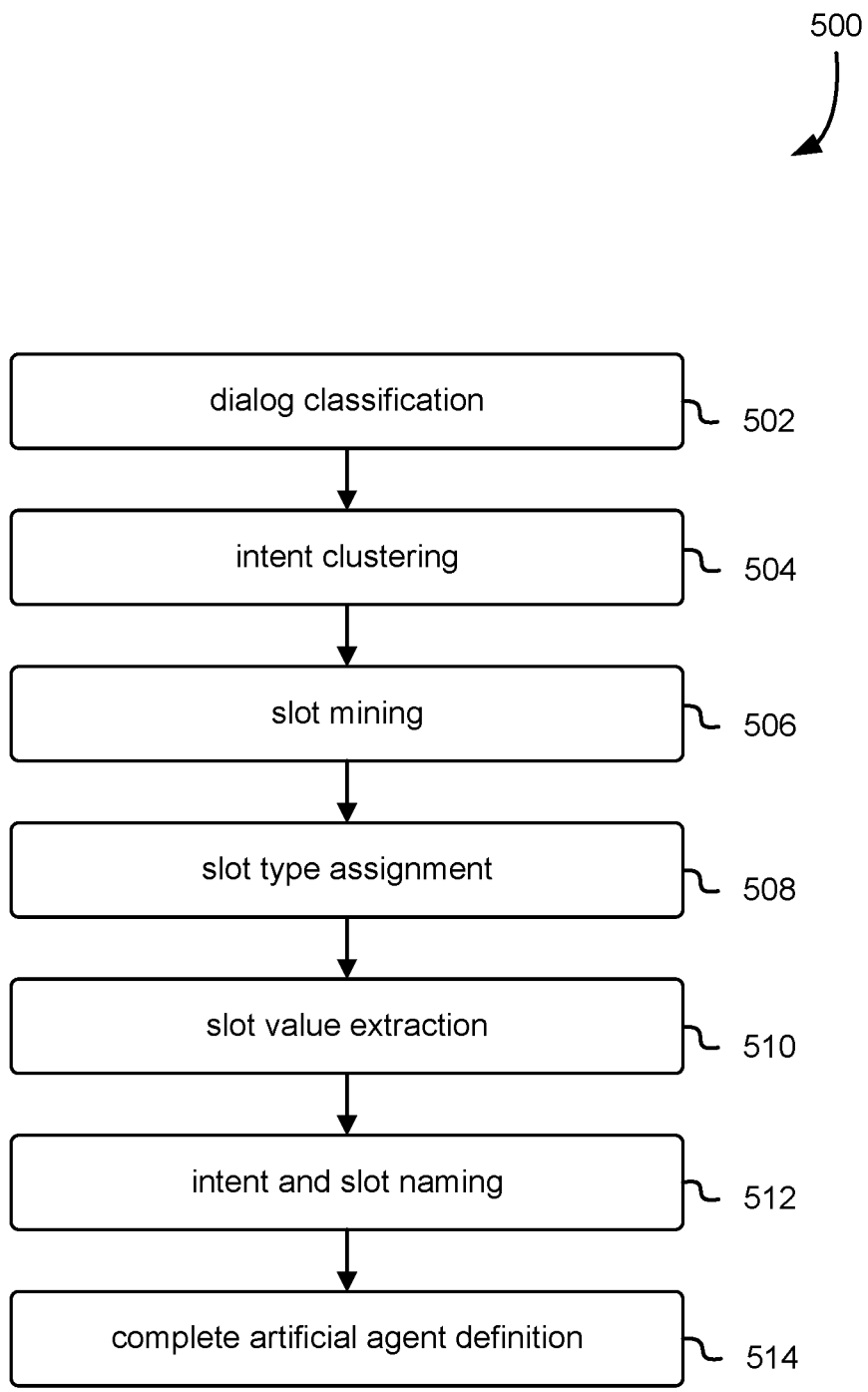
FIG. 5 illustrates an example process of generating a definition of an artificial agent based on transcripts of communications, in accordance with at least one embodiment.

FIG. 5 illustrates an example process of generating a definition of an artificial agent based on transcripts of communications, in accordance with at least one embodiment. Although the example procedure 500 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

In at least one embodiment, the example procedure 500 is implemented by a pipeline model, as part of an artificial agent generator, such as any of those depicted in FIGS. 1-4. The techniques and embodiments described in relation to FIG. 1 may also employ a pipeline model similar to what is described in relation to FIG. 5.

At 502, the pipeline performs dialog classification. The pipeline model relies on identification of three dialog acts: 1) a user informing an agent of their intent, 2) an agent eliciting a slot value from a user, and 3) a user providing an elicited slot value. These acts may be named, respectively, inform_intent, elicit_slot, and inform_slot.

In at least one embodiment, dialog act classification is approached as a text classification problem over these dialog acts. The classification may also include other labels, such as "other" or "social" that subsumes other user or agent acts in the conversations. In at least one embodiment, a RoBERTa model is pre-trained on this classification task, prepending speaker roles to each input utterance. A multi-domain task-oriented dialog dataset ("MultiDoGO"), may be used as training data for this dialog act classifier.

At 504, the pipeline performs intent clustering. Intent clustering uses turns predicted as having an inform_intent dialog act. In at least one embodiment, the pipeline applies a sentence encoder trained on a large-scale sentence-level paraphrasing dataset, such as a sentence BERT with a DistilROBERTa encoder, to compute embeddings for each turn. The sentence embeddings may then subsequently be clustered using k-means.

At 506, the pipeline performs slot mining. The slot mining involves analysis of agent turns with elicit_slot dialog acts, where the agent prompts a customer for information. This approach, as opposed to a method that focuses on user turns, is motivated by the observation that a trained agent will ask for the details necessary to resolve user intents, and ask for this information in a consistent manner. An advantage to this approach is that it is robust to handling PII, at least because it facilitates redaction of slot values in user turns. In at least one embodiment, slots are mined by clustering extracted agent prompts in a similar fashion as intent utterances, using sentence BERT with k-means. In embodiments, this step is adapted to pre-redacted transcripts, such as where the transcript has been pre-processed to remove PII.

At 508, the pipeline performs slot type assignment. To assign slot types to the resulting clusters, an agent prompt classifier is trained on prompts labeled with slot types. The pipeline assigns each slot cluster the most frequent corresponding predicted type. This approach allows the pipeline to induce multiple distinct slots of the same type.

At 510, the system performs slot value extraction. For slot clusters labeled as custom, the pipeline extracts values from user responses with the inform_slot dialog act to each prompt in the cluster using an extractive question answering model. In at least one embodiment, a factoid question answering model trained and fined-tuned using a pre-trained ROBERTa encoder. Slot value extraction can, in at least some embodiments, comprise removing words or phrases that are relate a particular entity, such as names, addresses, telephone numbers, or other forms of personally identifiable information. Slot value extraction can comprise identify removing information that should not be included in an agent definition resulting from the process 500.

This approach may also be used by the pipeline to provide carrier phrases for slots, by substituting an extracted value from a user utterance with a slot placeholder. Finally, to assign slots to intents, the pipeline applies a threshold on the proportion of conversations that the slot prompt co-occurs with each intent. This approach allows the same slot to be re-used across multiple intents.

At 512, the system performs intent and slot naming. This involves selecting the most frequent name generated by a model, such as Seq2Seq or RCAP, when applied to utterances from each intent or slot cluster.

At 514, the system completes the definition. A process for completing the definition of an artificial agent is described in more detail regarding FIG. 6.

Figure 6:
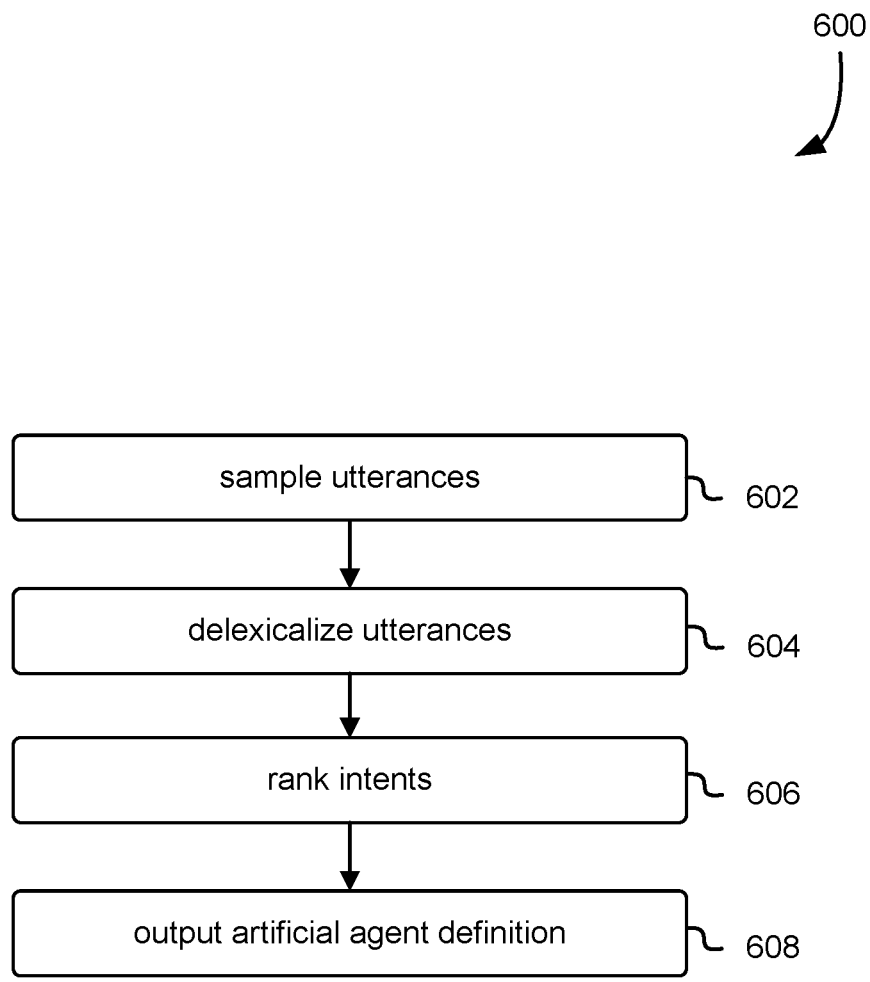
FIG. 6 illustrates an example process of generating a definition of an artificial agent using sample utterances derived from transcripts of communications, in accordance with at least one embodiment.

FIG. 6 illustrates an example process of generating a definition of an artificial agent using sample utterances derived from transcripts of communications, in accordance with at least one embodiment. Although the example procedure 600 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. The steps or operations depicted in FIG. 6 may be implemented by the pipeline component described above in relation to FIG. 5.

At 602, the pipeline samples representative and diverse utterances. In at least one embodiment, this comprises sampling utterances from each intent cluster as training samples for an artificial agent definition. The sampled utterances can include representative and diverse utterances from each cluster, based on the respective frequencies of the utterances.

At 604, the pipeline delexicalizes sample utterances. In delexicalization, slot values are replaced with slot names using an extractive question-answer ("QA") model.

At 606, the pipeline ranks intents, where intents with high confidence are ranked higher, and expressed first when a definition is applied, to improve satisfaction with the resulting chat experience. The ranking, in at least one embodiment, is based on cluster homogeneity scores. In at least one embodiment, the pipeline ranks statements of intent, such as statements requesting an action, that have been identified in one or more transcripts, and will generate, at 608, a definition that causes an artificial agent based on the definition to act in accordance with the ranking. This can include ordering statements to be made by the artificial agent, so that they reflect the ranking.

At 608, the pipeline outputs the resulting definition. The definition of an artificial agent may comprise configuration data or instructions that cause the agent, when communicating with a customer or other entity, to identify a statement of intent expressed by the customer and to generate statements that elicit, from the customer, the information needed to accomplish the intent.

Figure 7:
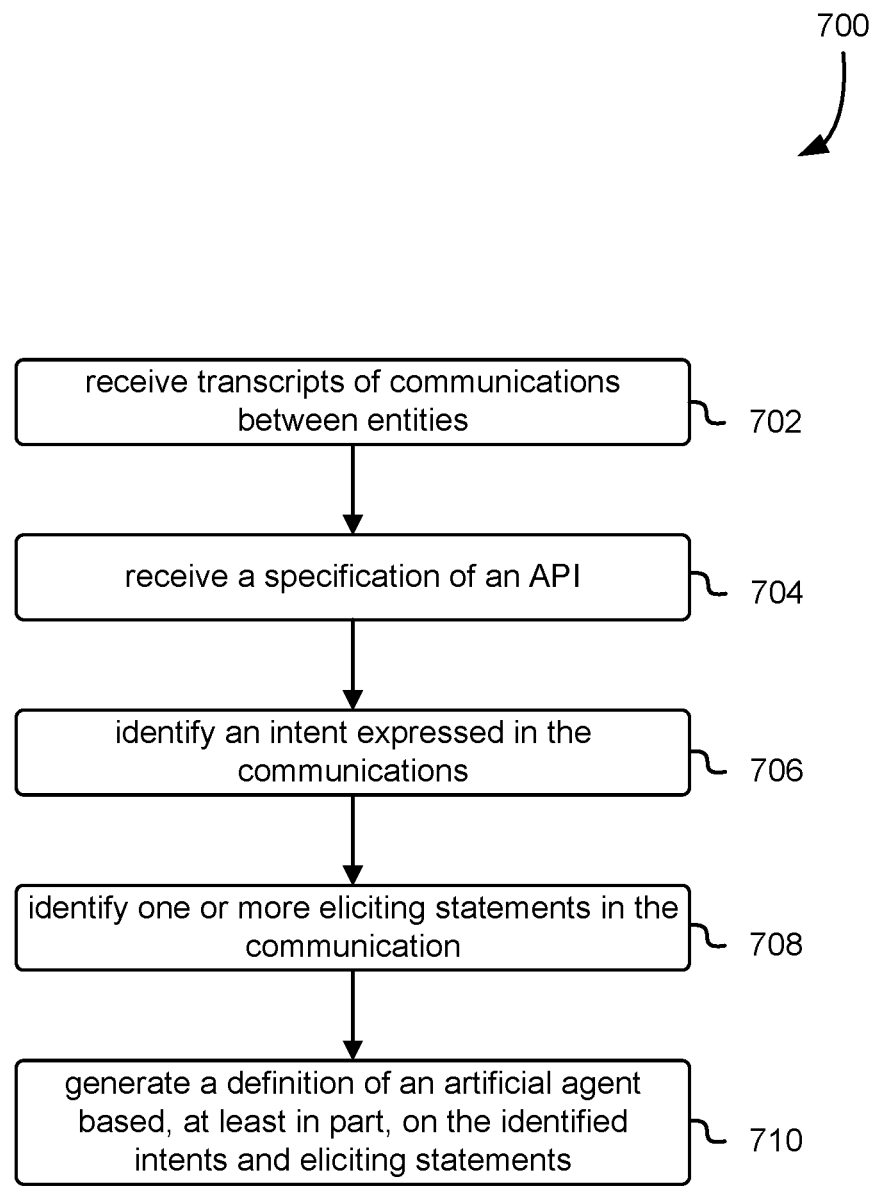
FIG. 7 illustrates an example process of generating an artificial agent based on transcripts of entity-to-entity interaction, in accordance with at least one embodiment.

FIG. 7 illustrates an example process of . . . . Although the example procedure 700 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. The steps or operations depicted in FIG. 7 may be implemented by any suitable combination of hardware and/ or circuitry, using any of the systems, devices, and techniques described in relation to the preceding FIGS. 1-6.

At 702, a system incorporating the techniques described herein receives a transcript of communications between entities. In some cases, the transcript may be for human-to-human communication, such as where one person is a customer and another other is an agent. In other cases, the transcript may be for human-to-bot communications, such as communications between a customer and an artificial agent.

At 704, the system receives a specification of an API. The specification includes information which describes functions that may be performed using the API. The specification may be represented as textual or binary data or metadata.

At 706, the system identifies an intent expressed in the communications. Here, an intent refers to an action requested by one of the entities in the communications, or a goal expressed or implied by that entity. Note that where a goal is expressed, it may be mapped to an action, and as such, the terms goal and intent may, where appropriate, be used interchangeably. For convenience, this entity may be referred to as the customer, and the other entity in the communication as the agent. The intent may be identified, as described for example in relation to FIG. 5, by classifying certain statements as being informative of intent, e.g. inform_intent actions. In at least one embodiment, this is done by performing a clustering operation in which statements in the communications are associated with an action that the application programming interface is capable of performing.

At 708, the system identifies one or more eliciting statement in the communications. An eliciting statement refers generally to a statement that is intended to prompt an entity to provide information, and in particular to a statement that is intended to elicit such information from the customer entity. As described in relation to FIG. 5, these statements may be classified as elicit_slot action, where "slot" refers to a parameter whose value can be filled in when the customer entity responds to the eliciting statement.

In at least one embodiment, eliciting statements are identified based, at least partially, on a clustering operation in which statements in the communications are associated with parameters of the application programming interface. The clustering may, in some cases, be around the parameters to a particular function, or may be around global parameters. For example, if an application programming interface is capable of performing functions $F_1$ and $F_2$, and both rely on a "name" parameter, the system might cluster elicit_slot statements around the "name" parameter irrespective of whether or not the function For $F_2$ is involved. Alternatively, the system might cluster elicit_slot statements around $F_1$'s "name" parameter and $F_2$'s name parameter separately.

In at least one embodiment, the system excludes PII" from a definition of an artificial agent. This may be done based, at least in part, on identifying potential PII using the API specification. Responses to elicit_slot statements, which may be classified as inform_slot statements as described above in relation to FIG. 5, may include PII. The system may then ensure that any inform_slot statements are simply not used in the resulting definition.

At 710, the system generates a definition of an artificial agent based, at least in part, on the identified intent and eliciting statements. The definition, in at least one embodiment, comprises templates of eliciting statements, generated based at least in part on eliciting statements identified in the transcript. Here, a template refers to data usable by an artificial agent to generate a statement that is appropriate in the context of a conversation between an entity and agent. The template may, in at least one embodiment, be a delexicalized version of one or more of the eliciting statements identified in the transcript. In some cases and embodiments, a definition of an artificial agent comprises data indicating one or more potential utterances, such as utterances that may potentially be made by the agent to solicit information, or utterances that may potentially be made by the customer to express an intent or to respond to an eliciting statement. In some cases and embodiments, a definition of an artificial agent comprises slot definitions that define relationships between elicited information and potential actions that may be taken by the artificial agent. In some cases and embodiments, a definition of an artificial agent comprises mappings between intents that may be expressed by the customer and elements of an API, or between potential utterances and elements of an API.

As one skilled in the art will appreciate in light of this disclosure, certain embodiments may be capable of achieving certain advantages, including improving the operation of artificial agents through increased adaptability to varied input and better integration with an API for implementing actions requested by an entity in a computer-facilitated communication, such as a chat between a customer entity and an artificial agent.

Figure 8:
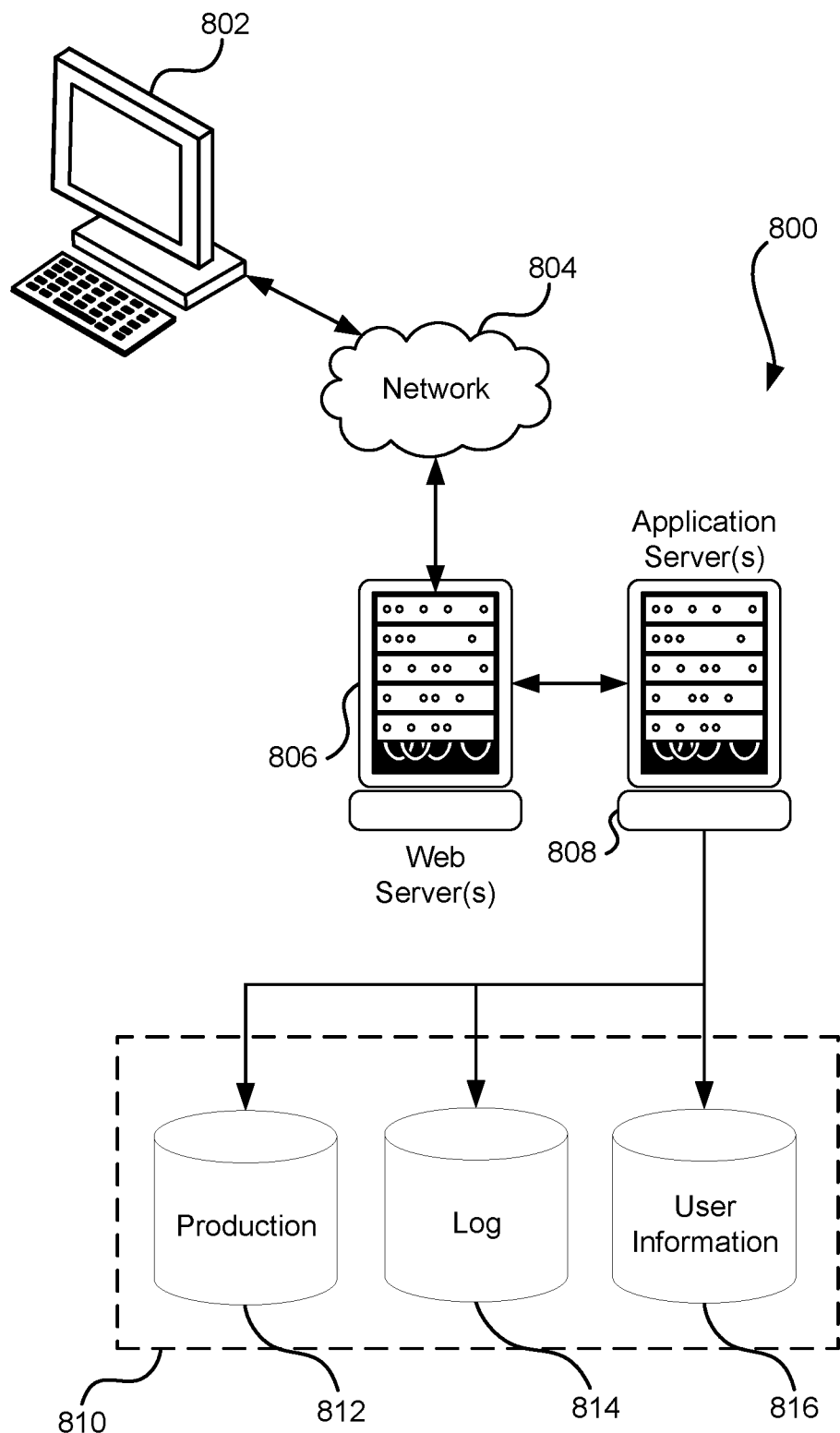
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory comprising instructions that, in response to execution by the at least one processor, cause the system to at least:
   receive one or more transcripts of communications between entities;
   identify an intent associated with an action requested in the communications based, at least in part, on an embedding of a portion of the transcripts generated by a transformer model and a mapping between the intent and one or more components of an application programming interface capable of performing at least one aspect of the action, wherein the one or more components are indicated in a specification of the application programming interface;
   identify one or more eliciting statements in the communications based at least in part on the identified intent, the one or more eliciting statements requesting, to one or more entities expressing the identified intent, information associated with parameters to the application programming interface; and
   generate, based on the identified intent and the one or more eliciting statements, a definition of an artificial agent, the definition comprising instructions for communicating with the one or more entities to identify a request to perform an action and to elicit information to use as parameters for invoking the application programming interface.

2. The system of claim 1, the at least one memory comprising further instructions that, in response to execution by the at least one processor, cause the system to at least:
   classify a statement in the communications as at least one of informative of intent or eliciting information.

3. The system of claim 1, wherein the intent is identified based, at least in part, on associations between statements in the communications with actions performed by the application programming interface.

4. The system of claim 1, wherein the definition of an artificial agent is based, at least in part, on identifying an association between the intent and the one or more eliciting statements.

5. The system of claim 1, wherein communications between entities comprise at least one of communication between two humans or communications between a human and an automated agent.

6. A method, comprising:
   receiving one or more transcripts of communications between entities;
   causing a transformer model to generate an embedding that corresponds to a portion of the one or more transcripts;
   identifying a requested action in the communications, wherein the requested action is identified based, at least in part, on the embedding and a mapping between the requested action and one or more components of an application programming interface indicated in a specification of the application programming interface;
   identifying one or more eliciting statements in the communications based at least in part on the requested action, the one or more eliciting statements requesting, to an entity causing the requested action, information associated with parameters to the application programming interface; and
   generating, based at least in part on the requested action and the one or more eliciting statements identified in the communications, a definition of an artificial agent.

7. The method of claim 6, further comprising: identifying one or more statements in the communications as informative of an intent of an entity to request an action.

8. The method of claim 6, further comprising:
   identifying one or more statements in the communications as eliciting information.

9. The method of claim 6, further comprising:
   excluding the-personally identifiable information from the definition of the artificial agent, based at least in part on classifying a statement as being responsive to an eliciting statement.

10. The method of claim 6, further comprising:
    performing a clustering operation in which statements in the communications are associated with an action performed by the application programming interface.

11. The method of claim 6, wherein the definition comprises mappings to actions that may be performed by the artificial agent, to accomplish the requested action.

12. The method of claim 6, further comprising:
    ranking two or more statements, in the one or more transcripts, that request an action; and
    generating the definition of the artificial agent based at least in part on the ranking.

13. The method of claim 6, wherein the definition comprises information indicative of a statement of intent and an association between the statement of intent and one or more eliciting statements.

14. A non-transitory computer-readable storage medium comprising executable instructions that, as a result of being executed by one or more processors of a computer system, cause the computer system to at least:
    receive one or more transcripts of communications between entities;
    cause a transformer model to generate an embedding of at least a portion of the one or more transcripts;
    identify a requested action in the communications, wherein the requested action is identified based, at least in part, on the embedding and a mapping between the requested action and one or more components of an application programming interface indicated in a specification of the application programming interface;
    identify one or more eliciting statements in the communications based at least in part on the requested action, the one or more eliciting statements requesting, to an entity causing the requested action, information associated with parameters to the application programming interface; and
    generate, based at least in part on the requested action and the one or more eliciting statements identified in the communications, a definition of an artificial agent.

15. The non-transitory computer-readable storage medium of claim 14, comprising further instructions that, as a result of being executed by the one or more processors, cause the computer system to:
    identify one or more statements in the communications as informative of an intent of an entity to request an action.

16. The non-transitory computer-readable storage medium of claim 14, comprising further instructions that, as a result of being executed by the one or more processors, cause the computer system to:
    identify one or more statements in the communications as eliciting information.

17. The non-transitory computer-readable storage medium of claim 14, comprising further instructions that, as a result of being executed by the one or more processors, cause the computer system to:
   perform a clustering operation in which statements in the communications are associated with an action performed by the application programming interface.

18. The non-transitory computer-readable storage medium of claim 14, comprising further instructions that, as a result of being executed by the one or more processors, cause the computer system to:
   identify the one or more eliciting statements based, at least in part, on a clustering operation in which statements in the communications are associated with parameters of the application programming interface.

19. The non-transitory computer-readable storage medium of claim 14, wherein communications between entities comprise at least one of communications between two humans or communications between a human and an automated agent.

20. The non-transitory computer-readable storage medium of claim 14, wherein the definition comprises a mapping from at least one of a statement of intent or a potential utterance to an element of an application programming interface.

* * * * *